(12) United States Patent
Kaur et al.

(10) Patent No.: US 12,097,882 B2
(45) Date of Patent: Sep. 24, 2024

(54) VEHICLE-TO-EVERYTHING (V2X) COMMUNICATION BASED ON USER INPUT

(71) Applicant: Micron Technology, Inc., Boise, ID (US)

(72) Inventors: Gurtaranjit Kaur, Boise, ID (US); Kathryn Haley Russo, Boise, ID (US); Aparna Limaye, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 269 days.

(21) Appl. No.: 17/654,002

(22) Filed: Mar. 8, 2022

(65) Prior Publication Data
US 2023/0303121 A1    Sep. 28, 2023

(51) Int. Cl.
*B60W 60/00*    (2020.01)
*G06F 3/16*    (2006.01)
*G08B 25/00*    (2006.01)
*G08G 1/09*    (2006.01)
*H04W 4/029*    (2018.01)
*H04W 4/40*    (2018.01)
*H04W 4/90*    (2018.01)

(52) U.S. Cl.
CPC ........ *B60W 60/0016* (2020.02); *G08B 25/00* (2013.01); *G08G 1/091* (2013.01); *H04W 4/029* (2018.02); *H04W 4/40* (2018.02); *H04W 4/90* (2018.02); *G06F 3/167* (2013.01)

(58) Field of Classification Search
None
See application file for complete search history.

(56) References Cited

U.S. PATENT DOCUMENTS

| 9,646,428 | B1 * | 5/2017 | Konrardy | G06Q 10/0635 |
| 2018/0208195 | A1 * | 7/2018 | Hutcheson | G08G 1/162 |
| 2019/0130742 | A1 * | 5/2019 | Tokunaga | G08G 1/09 |
| 2022/0250653 | A1 * | 8/2022 | Tomizawa | B60W 60/0024 |

* cited by examiner

*Primary Examiner* — Todd Melton
(74) *Attorney, Agent, or Firm* — Harrity & Harrity, LLP

(57) ABSTRACT

In some implementations, a device associated with a vehicle may receive, based on user input to an interface of the vehicle, information indicating an incident associated with the vehicle, wherein the user input indicates at least one of: whether the incident is associated with the user of the vehicle, or whether the incident is associated with an event outside of the vehicle. The device may transmit, to a system and via a transceiver of the vehicle, a message indicating the incident associated with the vehicle. The device may receive, from the system and via the transceiver of the vehicle, an acknowledgement of the message, wherein the acknowledgement indicates a classification of the incident. The device may cause the vehicle to perform one or more actions based on the incident associated with the vehicle and based on the classification of the incident.

25 Claims, 11 Drawing Sheets

VEHICLE-TO-EVERYTHING (V2X) COMMUNICATION BASED ON USER INPUT

TECHNICAL FIELD

The present disclosure generally relates to vehicle-to-everything (V2X) communication and, for example, to V2X communication based on user input.

BACKGROUND

Vehicle-to-everything (V2X) communication may involve a communication between a vehicle (or a device of the vehicle) and an entity, where the entity may affect or be affected by the vehicle. V2X communication may incorporate other more specific types of communication, such as vehicle-to-infrastructure (V2I) communication, vehicle-to-network (V2N) communication, vehicle-to-vehicle (V2V) communication, vehicle-to-pedestrian (V2P) communication, vehicle-to-device (V2D) communication, and vehicle-to-grid (V2G) communication. V2X communication may be used to improve road safety, traffic efficiency, and/or energy savings.

DETAILED DESCRIPTION

Figure 1:
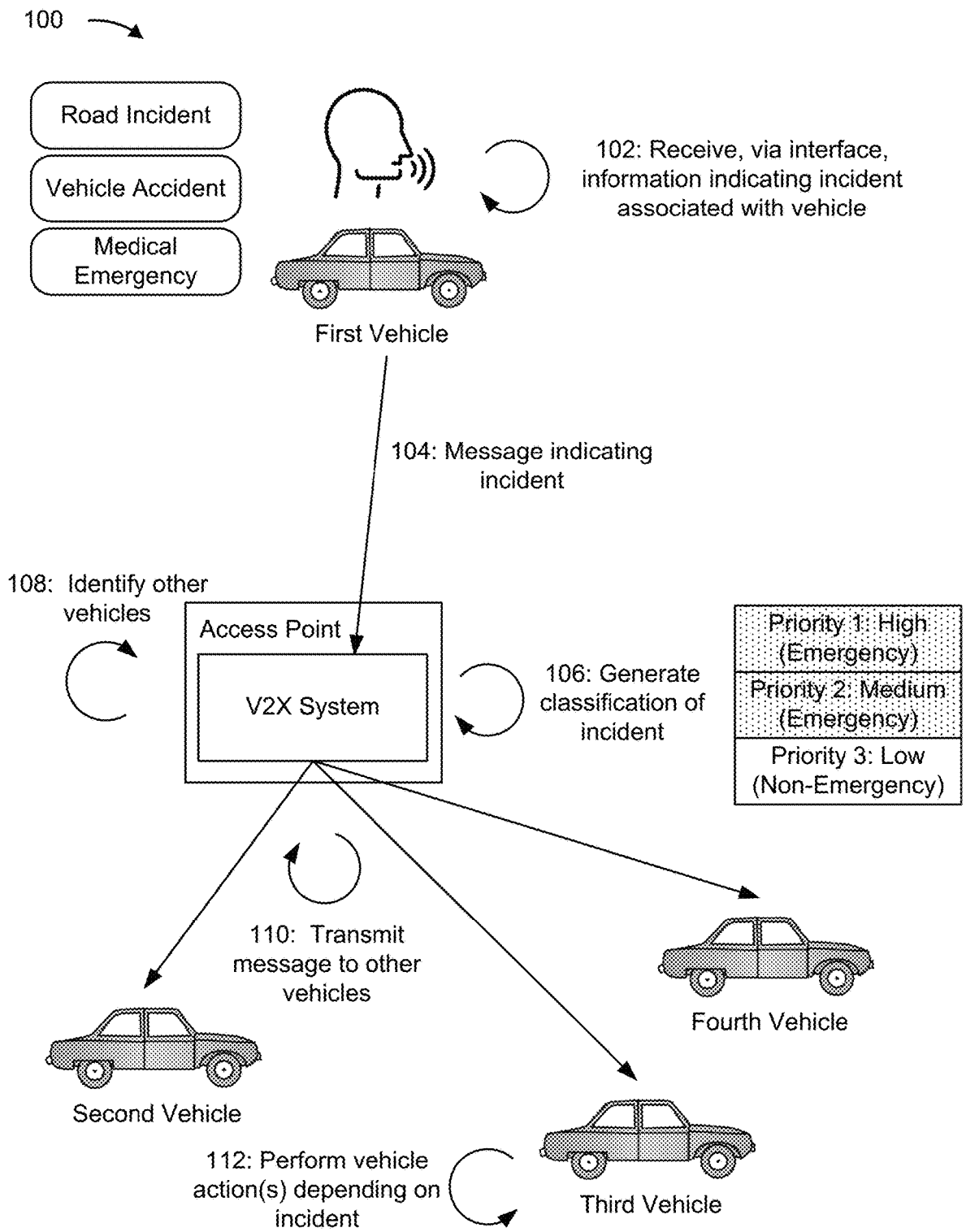
FIG. 1 is a diagram illustrating an example relating to generating a classification of an incident and transmitting messages to vehicles based on the classification of the incident.

Vehicle-to-everything (V2X) communication may involve a communication between a vehicle (or a device of the vehicle) and an entity, where the entity may affect or be affected by the vehicle. V2X communication may allow vehicles to communicate with each other and/or with traffic infrastructure. V2X communication may be used to improve road safety, traffic efficiency, and/or energy savings. For example, a vehicle that detects an event (e.g., traffic, a vehicle accident, poor road conditions, such as icy roads, and so on) using sensor information obtained from sensors of the vehicle may transmit an indication of the event to other vehicles that are located within a certain distance from the vehicle. The other vehicles may perform actions depending on the event.

One problem associated with V2X communication is that some events may not be detected by the sensors of the vehicle. Such events may occur inside the vehicle or outside the vehicle. As an example, a medical emergency of a user of the vehicle (e.g., a driver or passenger of the vehicle) may not be detectable by the sensors of the vehicle. As another example, events such as unusual traffic diversions or vehicle accidents may not be detectable by the sensors of the vehicle. These events may not be detectable due to traffic, sensor malfunction, limitations of image recognition software, or for other reasons. In some cases, sensors that otherwise would be able to detect the events may be absent, non-functional, or may provide an inaccurate classification of information.

Such events are often detectable by the user of the vehicle, even when not detectable by the sensors of the vehicle. For example, the user of the vehicle may detect whether a medical emergency has occurred within the vehicle, or whether events such as traffic diversions or vehicle accidents have occurred outside of the vehicle. Although the user of the vehicle may possess knowledge of such events, the vehicle may be unable to transmit information indicating the user's knowledge to the other vehicles. In other words, the other vehicles, which may be located in proximity to the vehicle (e.g., capable of receiving a V2X communication directly from the vehicle), may be unable to benefit from the user's knowledge regarding events that are not detectable using vehicle sensors. The vehicle may be limited to transmitting only sensor information detected by the sensors of the vehicle, and may be unable to transmit the information indicating the user's knowledge of the events. As a result, the other vehicles may be at higher risk of facing dangerous road conditions, increased traffic, and so on.

In some implementations described herein, to solve the problems described above, as well as how to perform V2X communication using information that supplements sensor information captured by vehicle sensors, a technical solution is described herein for performing V2X communication using user input. A vehicle may include an interface configured to receive user input from a user of the vehicle. The interface may include a display screen for receiving touch input from the user and/or a microphone for receiving voice input from the user. The vehicle may receive, based on the user input to the interface, information indicating an incident associated with the vehicle. The user input may indicate whether the incident is associated with the user of the vehicle (e.g., a medical emergency), or whether the incident is associated with an event outside of the vehicle (e.g., a road incident or a vehicle accident).

In some implementations, the vehicle may transmit, to a V2X system, a message indicating the incident associated with the vehicle. The V2X system may generate a classification of the incident based on the incident associated with the vehicle. The classification may be an emergency classification or a non-emergency classification, depending on the incident associated with the vehicle. The classification of the incident may be associated with a severity level, where the severity level may be based on whether the classification corresponds to the emergency classification or the non-emergency classification.

In some implementations, the V2X system may transmit, to the vehicle, an acknowledgement of the message indicating the incident associated with the vehicle. The acknowledgement may indicate the classification of the incident. For example, the acknowledgement may indicate whether the classification of the incident corresponds to the emergency classification or the non-emergency classification. The V2X system may perform one or more actions based on the classification of the incident. For example, the V2X system may determine whether to transmit (e.g., via a broadcast), to other vehicles, messages that indicate the incident associated with the vehicle and/or vehicle actions to be performed by the other vehicles based on the incident associated with the vehicle. The V2X system may be responsible for distributing messages to other vehicles or other infrastructure based on user classification and/or message priority.

In some implementations, the vehicle may generate the classification of the incident, as opposed to the V2X system. The vehicle may determine whether to transmit the message to other vehicles or other infrastructure based on the user classification and/or message priority.

In some implementations, the other vehicles may receive (e.g., via the broadcast) the messages from the V2X system, where the messages may be based on the user input indicating the incident associated with the vehicle. The other vehicles may otherwise be unable to detect the incident associated with the vehicle. As a result, the other vehicles may benefit from the user input received at the vehicle, which may be useful for the other vehicles in avoiding traffic or dangerous road conditions.

FIG. 1 is a diagram illustrating an example 100 relating to generating a classification of an incident and transmitting messages to vehicles based on the classification of the incident. As shown in FIG. 1, example 100 includes multiple vehicles, such as a first vehicle, a second vehicle, a third vehicle, and a fourth vehicle. Example 100 also includes a V2X system and an access point (e.g., a base station). The V2X system may be associated with (e.g., integrated with or co-located with) the access point. These devices are described in more detail in connection with FIGS. 7-9.

In some implementations, actions performed by the vehicle as described herein (e.g., transmitting, receiving, determining, and so on) may be performed by one or more devices of the vehicle. For example, actions performed by the vehicle as described herein may be performed by a dashboard device integrated with the vehicle, a transceiver of the vehicle, and/or a computing node of the vehicle (e.g., a computer integrated with the vehicle).

As shown by reference number 102, a vehicle (e.g., the first vehicle) may receive, based on user input to an interface of the vehicle from a user of the vehicle, information indicating an incident associated with the vehicle. The user input may indicate whether the incident is associated with an event outside of the vehicle. For example, the incident associated with the event outside of the vehicle may be a road incident or a vehicle accident. Additionally, or alternatively, the user input may indicate whether the incident is associated with the user of the vehicle. For example, the incident associated with the user of the vehicle may be a medical emergency suffered by the user. The user of the vehicle may be a driver of the vehicle or a passenger of the vehicle.

In some implementations, the interface may be a user interface or a human-machine interface. The user input received via the interface may be a touch input. For example, the interface may include a display screen for receiving the touch input from the user. The touch input may be associated with a selection of an incident type from a listing of possible incident types displayed on the display screen. Additionally, or alternatively, the user input received via the interface may be a voice input. For example, the interface may include a microphone for receiving the voice input from the user. The vehicle may use speech recognition or related techniques to determine the incident type based on the voice input.

In some implementations, the user input may be received from the user, which may be a driver of the vehicle or a passenger of the vehicle. The user input received via the interface may indicate an occurrence of the incident associated with the vehicle, where the incident may be related to the road incident, the vehicle accident, the medical emergency, or another type of incident that occurs inside of the vehicle or outside of the vehicle. Additionally, or alternatively, the user input may indicate a severity of a medical emergency, may indicate whether the user of the first vehicle is able to drive, and/or may indicate a destination for the first vehicle (e.g., a hospital). The V2X system may use this information to classify the incident and/or to determine whether and which type of messages to transmit to other vehicles and/or traffic infrastructure, as described in more detail below.

In some implementations, the incident associated with the vehicle is not detected by a sensor of the vehicle (e.g., is not detected by any sensors of the vehicle). For example, a sensor malfunction or a road obstruction may prevent sensors of the vehicle from detecting the incident. The user of the vehicle may detect the incident associated with the vehicle. The user input from the user via the interface may allow the vehicle to receive information regarding the incident, which may otherwise not be detected by the vehicle.

As shown by reference number 104, the vehicle may transmit, to the V2X system, a message indicating the incident associated with the vehicle. The vehicle may generate the message (e.g., a V2X message in a particular format, such as a Decentralized Environmental Notification Message (DENM) format) indicating the incident based on the user input. The message may indicate the information associated with the incident, such as an indication of an incident type. An incident type may include, for example a road incident, a vehicle accident, a medical emergency, or another type of incident. In some implementations, the message may include additional information associated with the vehicle. For example, the message may indicate a location (e.g., a geographic location) of the vehicle and/or a location (e.g., a geographic location) of the incident. In some cases, the location of the vehicle and the location of the incident may be the same location. The message may include, based on the user input indicating that the incident is associated with the event outside of the vehicle, an image associated with the incident and/or a video associated with the incident. The image and/or video may be captured by a camera of the vehicle. Additionally, or alternatively, the message may include sensor information detected by one or more sensors (e.g., accelerometer and/or gyroscope) associated with the vehicle. The sensor information may provide additional contextual information regarding the incident. For example, the sensor information may indicate a speed of the vehicle, a direction of the vehicle, and/or an orientation of the vehicle. In some implementations, the message may include information based on the user input. For example, the message may indicate a severity of a medical emergency, may indicate whether the user of the first vehicle is able to drive, and/or may indicate a destination (e.g., a hospital) for the first vehicle.

Additionally, or alternatively, the message transmitted by the first vehicle may include a vehicle identifier of the first vehicle, such as a vehicle identification number (VIN), an identifier used to identify the vehicle in V2X messages, or the like. Additionally, or alternatively, the message transmitted by the first vehicle may include an indication of a V2X capability of the first vehicle. The V2X capability may indicate whether the first vehicle is capable of transmitting V2X messages to other vehicles and/or traffic infrastructure. The V2X system may generate messages to the other vehicles and/or the traffic infrastructure differently depending on the V2X capability. For example, depending on the V2X capability, the V2X system may generate messages that indicate the vehicle ID of the first vehicle and/or the first vehicle location.

Additionally, or alternatively, the message transmitted by the first vehicle may include an indication of an autonomous driving capability of the first vehicle, such as a level of autonomous driving. For example, the indication of the autonomous driving capability may indicate that the first vehicle has no autonomous driving capability, that the first vehicle has a lower level of autonomous driving capability (e.g., a level 3 autonomous driving capability or a partial autonomous driving capability), or that the first vehicle has a higher level of autonomous driving capability (e.g., a level 5 autonomous driving capability or a full autonomous driving capability).

In some implementations, the V2X system may be a central system or an intelligent transportation system (ITS). The V2X system may be integrated with or co-located with an access point, such as a base station or a wireless access point. In this case, the V2X system may be associated with the access point that serves a geographic location (e.g., a geographic region) in which the vehicle is located and/or in which the incident occurs. The V2X system may be a central system, or the V2X system may include multiple systems that are distributed per access point. Alternatively, the V2X system may be external to access points. For example, the V2X system may be in a core network, or the V2X system may be associated with an application server that communicates with the access points via the core network. The V2X system may be able to communicate with the access points, where each access point may serve a geographic region in which vehicles are located. In this example, the V2X system may serve the geographic region in which the vehicles are located, including the first vehicle, the second vehicle, the third vehicle, and the fourth vehicle.

Figure 6:
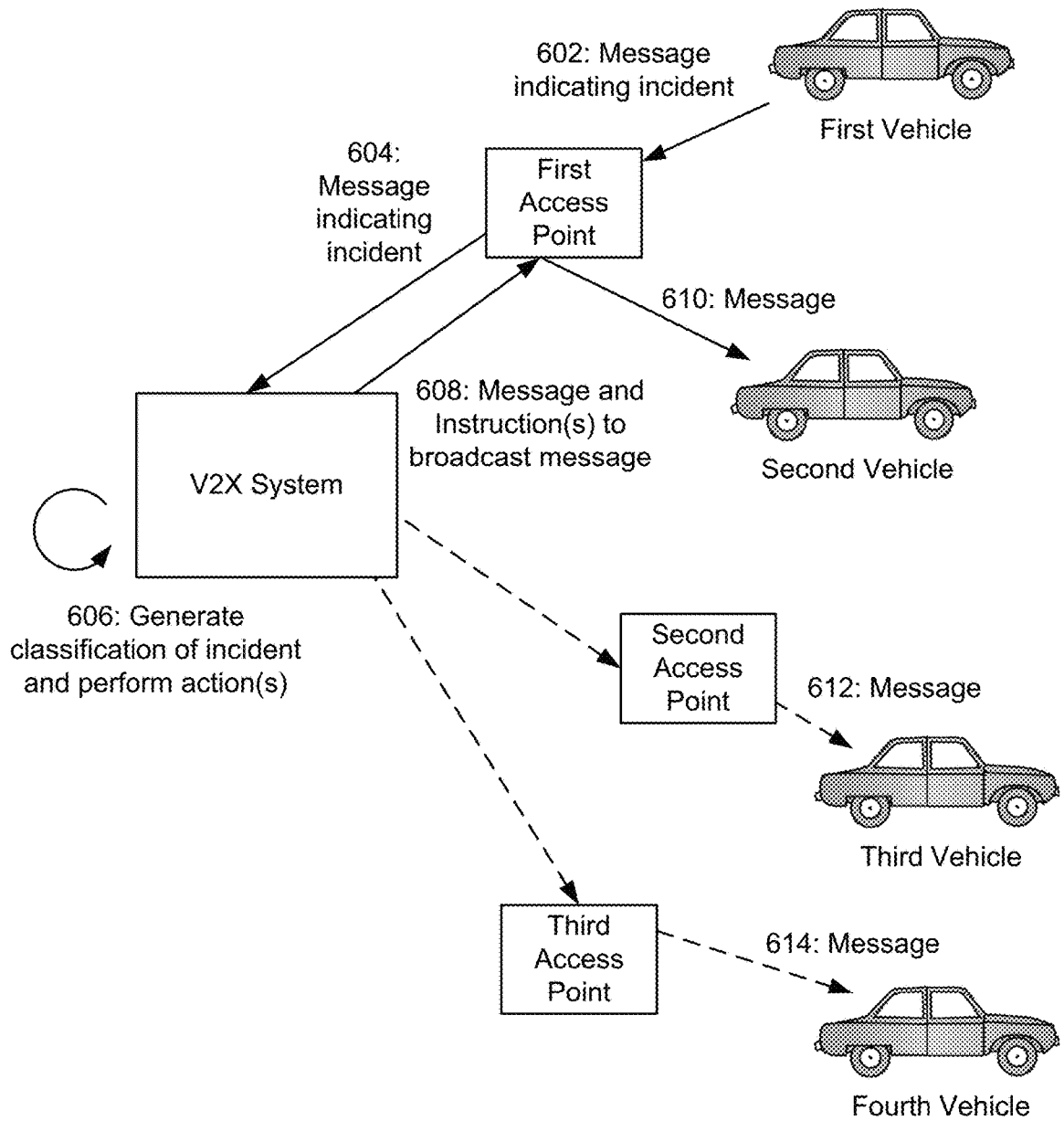
FIG. 6 is a diagram illustrating an example relating to transmitting messages to a plurality of vehicles via one or more access points.

Alternatively, the V2X system may not be co-located with the access point (not shown in FIG. 1, but as shown in FIG. 6 and described in more detail below). Rather, the V2X system may be able to communicate with multiple access points. Each access point may serve a geographic region in which vehicles are located. In this case, one of the access points may serve a geographic region associated with the vehicle and/or the incident.

As shown by reference number 106, the V2X system may generate a classification of the incident based on the incident associated with the vehicle. The classification may be an emergency classification or a non-emergency classification depending on the incident associated with the vehicle. The V2X system may generate the classification using the message received from the vehicle, which may indicate the incident and/or an incident type. The message may include textual information, which may be derived from the user input (e.g., the voice input and/or the touch input). For example, the message may include a transcript of a voice command spoken by the user (e.g., a voice command indicating that a fallen tree is blocking a path of the vehicle). As another example, the message may indicate a selection received via the touch input (e.g., a selection of a vehicle accident type). Additionally, the V2X system may generate the classification using the additional information associated with the incident, such as the location of the vehicle, the image, the video, and/or the sensor information. In some implementations, V2X system may classify the incident based on the user input to the interface associated with the vehicle. For example, the user input may indicate a severity of a medical emergency, and the V2X system may classify the incident based on the severity of the medical emergency.

In some implementations, the V2X system may generate the classification of the incident using a classifier, which may be a type of machine learning algorithm used to assign the classification or label to the incident. The classifier may be trained using labeled data. In this case, the labeled data may include user phrases and associated classifications (e.g., emergency classifications or non-emergency classifications). For example, user phrases indicating chest tightness, sleepiness, blurry vision, or other medical conditions may be associated with the emergency classification due to a medical emergency, or may be associated with the non-emergency classification depending on the severity of the medical emergency. As another example, a user phrase indicating traffic congestion, a road accident, a blocked road due to road work, a fallen object impeding travel on a road, and other incidents may be associated with the emergency classification due to a road incident or vehicle accident, or may be associated with the non-emergency classification depending on the severity of the incident. Further, the V2X system may apply image recognition, audio recognition, or other techniques to the image and/or video to determine additional contextual information related to the incident. This additional contextual information may be an additional input to the classifier when generating the classification of the incident. In some implementations, user input in classification may expedite machine learning with respect to image recognition and other data. For example, when image recognition is not able to interpret images that are not typically encountered, user input regarding a nature of the images may improve the classification.

As an example, an emergency classification associated with a high priority (or high severity level) may involve life threatening incidents or multiple vehicle reports indicating major emergencies (e.g., vehicle accidents). An emergency classification associated with a medium priority (or medium severity level) may involve a traffic diversion report (e.g., a vehicle accident holdup on a highway) or an indication of weather that could cause an emergency situation for the vehicle or user (e.g., icy roads). A non-emergency classification associated with a low priority (or low severity level) may involve a traffic report associated with a non-emergency or a non-emergency weather notification.

In some implementations, the V2X system may generate the classification based on one or more other messages received from one or more other vehicles. The one or more other vehicles may include the second vehicle, the third vehicle, and the fourth vehicle. The other messages may provide additional information that corroborates the message indicating the incident associated with the vehicle. For example, when multiple vehicles transmit messages to the V2X system indicating a same incident at a particular location, the V2X system may generate the classification with an improved confidence, as opposed to generating the classification from a single message received from the vehicle.

In some aspects, the V2X system may be capable of validating user input by evaluating multiple user inputs and/or traffic patterns to ensure that the user input is correct prior to broadcasting messages to other vehicles. In certain situations, the V2X system may wait for validation based on some criteria given prior to broadcasting the messages. For example, if a user reports a road closure due to some emergency classification (e.g., fallen tree, landslide, etc.), the V2X system may validate the road closure by checking other vehicle traffic patterns such as congestion near the area, route deviations, and/or similar reports from other users. Such information may be helpful in validating the user classification/message, such that messages being broadcasted to other vehicles are as accurate as possible.

As shown by reference number 108, the V2X system may identify other vehicles, such as the second vehicle, the third vehicle, and the fourth vehicle. The V2X system may identify other vehicles that are within a defined distance from the vehicle, based on periodic signaling between the V2X system and the other vehicles. The periodic signaling may allow the V2X system to track locations of the other vehicles. In some implementations, the V2X system may identify the other vehicles that are along a route associated with the vehicle. For example, the V2X system may identify a current location of the vehicle, a destination of the vehicle, and a route taken by the vehicle to travel to the destination. The V2X system may identify the other vehicles that are also along the route taken by the vehicle, based on the periodic signaling between the V2X system and the other vehicles. Based on this signaling from the other vehicles, the V2X system may determine which other vehicles are also along the route taken by the vehicle.

As shown by reference number 110, the V2X system may transmit one or more messages to the other vehicles. The V2X system may transmit the one or more messages based on the classification of the incident being the emergency classification. In some implementations, the V2X system may transmit the one or more messages via unicast. The one or more messages may be detected by the other vehicles, such as other vehicles that are located within the defined distance from the vehicle or other vehicles that are along the route taken by the vehicle. In this case, certain vehicles that are not located within the defined distance from the vehicle or that are not along the route taken by the vehicle may not receive the one or more messages. The one or more messages may indicate the incident associated with the vehicle. The one or more messages may indicate one or more vehicle actions to be performed by the other vehicles based on the incident associated with the vehicle.

In some implementations, the V2X system may broadcast the one or more messages, such that other vehicles that are located in a service area of the access point associated with the V2X system may receive the one or more messages. In other words, with the broadcast, surrounding vehicles may be able to detect the one or more messages. The V2X system may broadcast the one or more messages at a selected power level, such that vehicles that are within a certain distance from the V2X system may receive the one or more messages, and vehicles that are outside a certain distance from the V2X system may not receive the one or more messages. Depending on the incident, the V2X system may transmit the one or more messages at a certain power level, so that vehicles that are closest to the first vehicle and/or the incident associated with the first vehicle may receive the one or more messages. For example, a message indicating an incident associated with a full road closure (e.g., a blocked road) may be transmitted using a higher transmit power because this type of incident affects a greater number of vehicles that may be located farther from the incident, while a message indicating an incident associated with a partial road closure may be transmitted using a lower transmit power because this type of incident affects a smaller number of vehicles that may be located closer to the incident. Further, the message may be transmitted to vehicles within or outside of a service area that have destinations that would be impacted by the full road closure, such that a routing for the vehicles may be modified based on full road closure. The V2X system may identify such vehicles based on destination metadata.

In some implementations, the V2X system may transmit a message to a traffic infrastructure based on the classification of the incident being the emergency classification. The traffic infrastructure may be associated with, for example, a signal light at a street intersection. The traffic infrastructure may receive the message from the V2X system, and the traffic infrastructure may manipulate the signal light to let a certain vehicle (e.g., the first vehicle or an emergency vehicle) pass through the intersection. The V2X system may transmit the message to the traffic infrastructure in addition to or an as alternative to transmitting messages to the other vehicles.

In some implementations, the V2X system may transmit a vehicle identifier (ID) of the first vehicle to the other vehicles and/or the traffic infrastructure (e.g., an identifier that is used in V2X messages transmitted by the first vehicle to other vehicles). The other vehicles and/or the traffic infrastructure may store the vehicle ID in memory for a period of time (e.g., 15 minutes, 30 minutes, 1 hour, 2 hours, or 1 day). At a later time, one of the other vehicles may receive a V2X message transmitted by the first vehicle, where the V2X message may indicate a vehicle ID of the first vehicle that matches the stored vehicle ID. The other vehicle may receive the V2X message from the first vehicle based on the first vehicle being within a certain distance from the other vehicle (e.g., a V2X communication range). The other vehicle may autonomously steer out of the way to let the first vehicle pass the other vehicle based on receiving the V2X message with the vehicle ID that matches the stored vehicle ID. Similarly, when the traffic infrastructure, such as a traffic light, receives a V2X message transmitted by the first vehicle that indicates a vehicle ID that matches the stored vehicle ID, the traffic infrastructure may manipulate a light (e.g., turn the light green) to let the first vehicle pass through the intersection, and then return to normal operation after detecting that the first vehicle has passed through the intersection (e.g., based on a V2X message received from the first vehicle and/or failing to receive a V2X message from the first vehicle for a threshold amount of time). In some implementations, the V2X system may receive the vehicle ID from the first vehicle, such as in the message that indicates the incident.

In some implementations, the first vehicle may not have a V2X capability. For example, the first vehicle may not be capable of transmitting V2X messages to other vehicles, but may be capable of transmitting alert messages to the V2X system. In this case, rather than transmitting V2X messages to other vehicles, the first vehicle may periodically transmit an indication of a location of the first vehicle (sometimes called a first vehicle location) to the V2X system after transmitting the message indicating the incident and/or after receiving an acknowledgement from the V2X system. The V2X system may periodically transmit the first vehicle location in one or more messages transmitted to other vehicles and/or traffic infrastructure.

Based on the first vehicle location, another vehicle that receives the message from the V2X system may move to allow the first vehicle to pass (e.g., if the first vehicle location is within a threshold distance of the location of the other vehicle). Additionally, or alternatively, the traffic infrastructure may manipulate lights to allow the primary vehicle to pass based on the first vehicle location (e.g., if the first vehicle location is within a threshold distance of the location of the traffic infrastructure). The V2X system may periodically transmit the first vehicle location (e.g., based on periodic indications of the first vehicle location received from the first vehicle), and when the first vehicle location indicates that the first vehicle has passed the other vehicle (and/or the traffic infrastructure), the other vehicle (and/or the traffic infrastructure) may resume normal operation. In some implementations, the V2X system may determine whether the first vehicle has a V2X capability based on a message received from the first vehicle (e.g., the message indicating the incident). The V2X system may then determine one or more messages to transmit to the other vehicles and/or traffic infrastructure based on the V2X capability (e.g., whether to transmit periodic messages indicating the first vehicle location and/or whether to transmit a message indicating the vehicle ID).

In some implementations, the V2X system may determine whether to send messages to the other vehicles based on an indication of whether the user is able to drive and/or an autonomous driving capability of the first vehicle. For example, the V2X system may determine to send messages to the other vehicles when the user is able to drive and/or when the first vehicle has an autonomous driving capability. The messages may indicate for the other vehicles to let the primary vehicle pass. Conversely, the V2X system may determine to not send messages to the other vehicles when the user is not able to drive and the first vehicle does not have an autonomous driving capability (e.g., a higher or full autonomous driving capability, such as a level 5 autonomous driving capability). In this case, the V2X system may transmit a message to instruct the driver and/or the vehicle (which may have a lower or partial autonomous driving capability, such as a level 3 autonomous driving capability) to park the vehicle at the side of a road. In some implementations, the V2X system may determine which other vehicles are to receive messages based on an indication of the destination of the first vehicle. For example, the V2X system may send messages to vehicles and/or traffic infrastructure along a route to that destination (e.g., directly or by identifying one or more access points along the route). When the V2X system instructs the first vehicle to park along the side of the road, the V2X system may send messages to nearby vehicles of the type of medical emergency, where the nearby vehicles may output information (e.g., via an interface or a dashboard device) associated with the messages. The information may allow occupants of the nearby vehicles to perform actions to help the user of the primary vehicle (e.g., administering emergency procedures in case the user has suffered from a heart attack).

As shown by reference number 112, a vehicle, of the other vehicles, may perform vehicle actions in accordance with the one or more messages received from the V2X system. The vehicle may perform the vehicle actions depending on the incident. For example, the vehicle actions may involve determining an alternative route based on a road incident or vehicle accident. The vehicle actions may involve moving to a side of the road to allow a vehicle to pass by unimpeded based on the incident being a medical emergency. The vehicle actions may involve contacting an emergency dispatch system when the incident is a medical emergency. In some cases, the vehicle may be an autonomous vehicle that is capable of performing the vehicle actions in an autonomous manner. In these cases, the vehicle may autonomously determine the alternate route, move to the side of the road, and/or contact the emergency dispatch system. The vehicle may or may not provide an alert to a driver of the vehicle indicating the vehicle actions performed by the vehicle. In some cases, the vehicle is not an autonomous vehicle, and an alert may be outputted to the driver of the vehicle indicating the vehicle actions to be performed.

In some implementations, the other vehicles may determine to ignore the one or more messages, and in this case, the other vehicles may refrain from performing the vehicle actions. For example, when the V2X system broadcasts the one or more messages, some vehicles that receive the one or more messages may not necessarily need to perform the vehicle actions indicated in the one or more messages. For example, these vehicles may determine that the incident associated with the vehicle may not have an effect on the vehicles (e.g., due to a distance between the vehicle and the incident being greater than a threshold). In this case, the vehicles may decide to ignore the one or more messages.

In some implementations, the other vehicles may perform the vehicle actions based on the one or more messages received from the V2X system, where the one or more messages may be derived from the user input received at the vehicle. The user input may indicate the incident, which may otherwise by undetectable by sensors of the other vehicles. As a result, the other vehicles may benefit from the user input received at the vehicle. The other vehicles may benefit by a reduced travel time due to avoiding traffic, less dangerous road conditions, and so on. In the past, user input at the vehicle may have been limited to the user taking manual control of the vehicle, and did not involve using user input to enable V2X communication between vehicles. In this case, the V2X communication may be based on the user input, which may allow the other vehicles to benefit from perceptions of the user that would otherwise not be available to the other vehicles.

In some implementations, the message transmitted by the vehicle to the V2X system, and/or the message transmitted by the V2X system may be a V2X message associated with a message protocol. For example, the V2X message may be associated with a DENM message protocol, a Cooperative Awareness Message (CAM) message protocol, or another suitable message protocol.

In some implementations, the V2X system may generate the message as a DENM message. The DENM message may include a "cause" field, a "subcause" field, and a "severity" field. The V2X system may generate the DENM message and insert information into the "cause" field, the "subcause" field, and/or the "severity" field based on the user input and/or the classification of the incident. For example, the user input of medical emergency, road incident, traffic accident, etc. may be used to populate the "cause" field and/or the "subcause" field, and the classification of the incident may be used to populate the "severity" field. The location of the incident and/or the location of the vehicle (e.g., a primary vehicle that receives the user input) may be used to populate "event position" fields of the DENM message, which may indicate a latitude, a longitude, and an elevation associated with the incident.

As indicated above, FIG. 1 is provided as an example. Other examples may differ from what is described with regard to FIG. 1.

Figure 2:
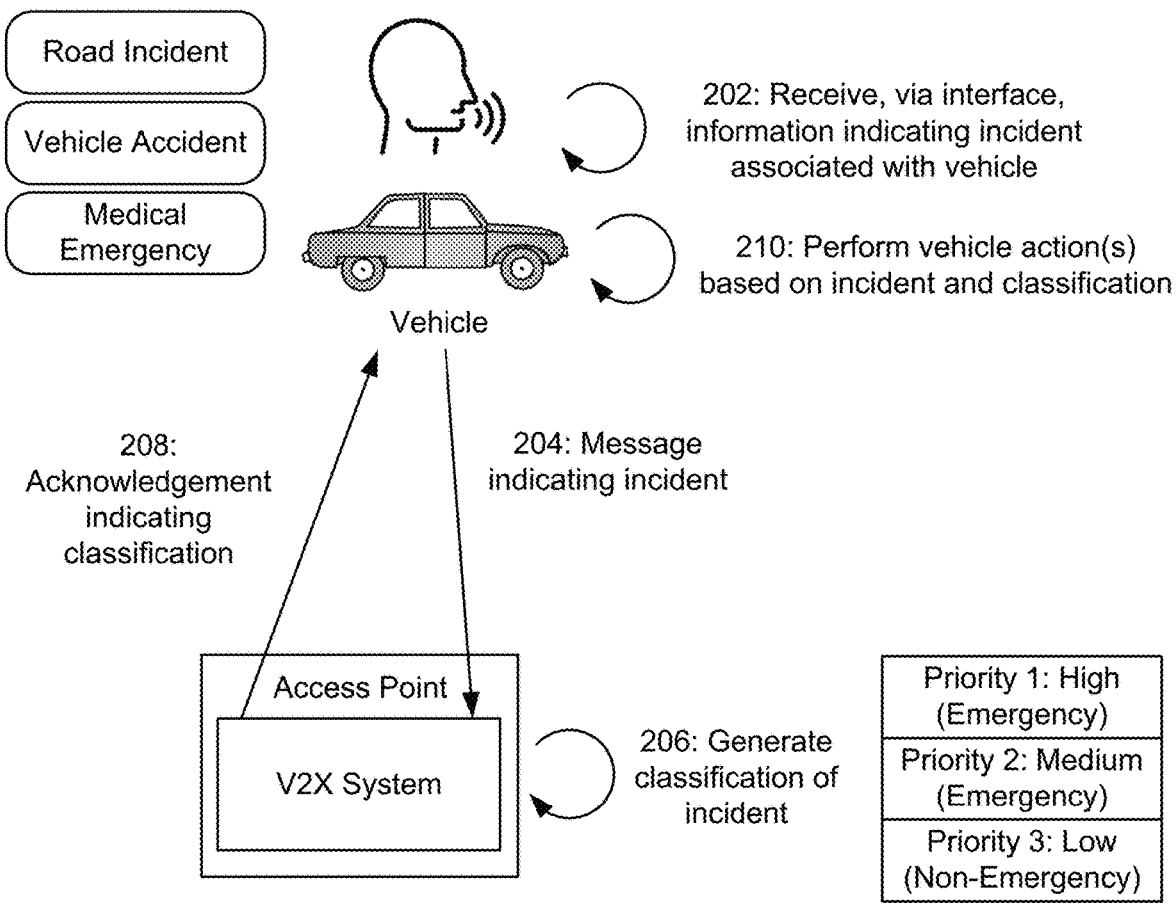
FIG. 2 is a diagram illustrating an example relating to performing vehicle actions based on an incident and a classification of the incident.

FIG. 2 is a diagram illustrating an example 200 relating to performing vehicle actions based on an incident and a classification of the incident. As shown in FIG. 2, example 200 includes a vehicle, a V2X system, and an access point (e.g., a base station). The V2X system may be associated with (e.g., integrated with or co-located with) the access point. Alternatively, the V2X system may not be co-located with access points (not shown in FIG. 2, but as shown in FIG. 6). These devices are described in more detail in connection with FIGS. 7-9.

As shown by reference number 202, the vehicle may receive, based on user input to an interface of the vehicle from a user of the vehicle, information indicating an incident associated with the vehicle. The user input may indicate whether the incident is associated with the user of the vehicle or an event outside of the vehicle.

As shown by reference number 204, the vehicle may transmit, to the V2X system, a message indicating the incident associated with the vehicle. The message may indicate the information associated with the incident, where the information may indicate whether the incident is associated with the road incident, the vehicle accident, the medical emergency, or another type of incident. The message may include textual information, which may be derived from the user input (e.g., the voice input and/or the touch input), where the textual information may describe the incident.

As shown by reference number 206, the V2X system may generate a classification of the incident based on the incident associated with the vehicle. The classification may be an emergency classification or a non-emergency classification depending on the incident associated with the vehicle. The V2X system may generate the classification using the message received from the vehicle, which may indicate the incident.

As shown by reference number 208, the V2X system may transmit, to the vehicle, an acknowledgement of the message, where the acknowledgement may indicate the classification of the incident. For example, the acknowledgement may indicate whether the incident is associated with the emergency classification or the non-emergency classification.

As shown by reference number 210, the vehicle may perform one or more vehicle actions based on the incident associated with the vehicle and based on the classification of the incident. The vehicle may perform the one or more vehicle actions in response to the emergency classification, where the one or more vehicle actions may depend on whether the incident is related to the road incident, the vehicle accident, or the medical emergency. The one or more vehicle actions are further described in connection to FIG. 3.

As shown by FIGS. 1 and 2, the vehicle may receive information indicating the incident, and the V2X system may receive the message indicating the incident and generate the classification of the incident. As shown in FIG. 1, the V2X system may identify other vehicles and transmit messages to the other vehicles indicating the incident and vehicle actions to be performed by the other vehicles based on the incident. As shown in FIG. 2, the V2X system may transmit a message to the vehicle from which the information indicating the incident was initially received, and the vehicle may perform vehicle actions based on the incident and the classification of the incident. In some implementations, the V2X system may determine whether to transmit the message to the vehicle and/or the other vehicles depending on the type of incident. For example, for an incident that involves a driver experiencing a medical event that is not an emergency, the V2X system may determine to transmit the message to only the vehicle and not to the other vehicles. As another example, for an incident that involves multiple vehicles on the road, the V2X system may determine to transmit messages to both the vehicle and the other vehicles.

As indicated above, FIG. 2 is provided as an example. Other examples may differ from what is described with regard to FIG. 2.

Figure 3:
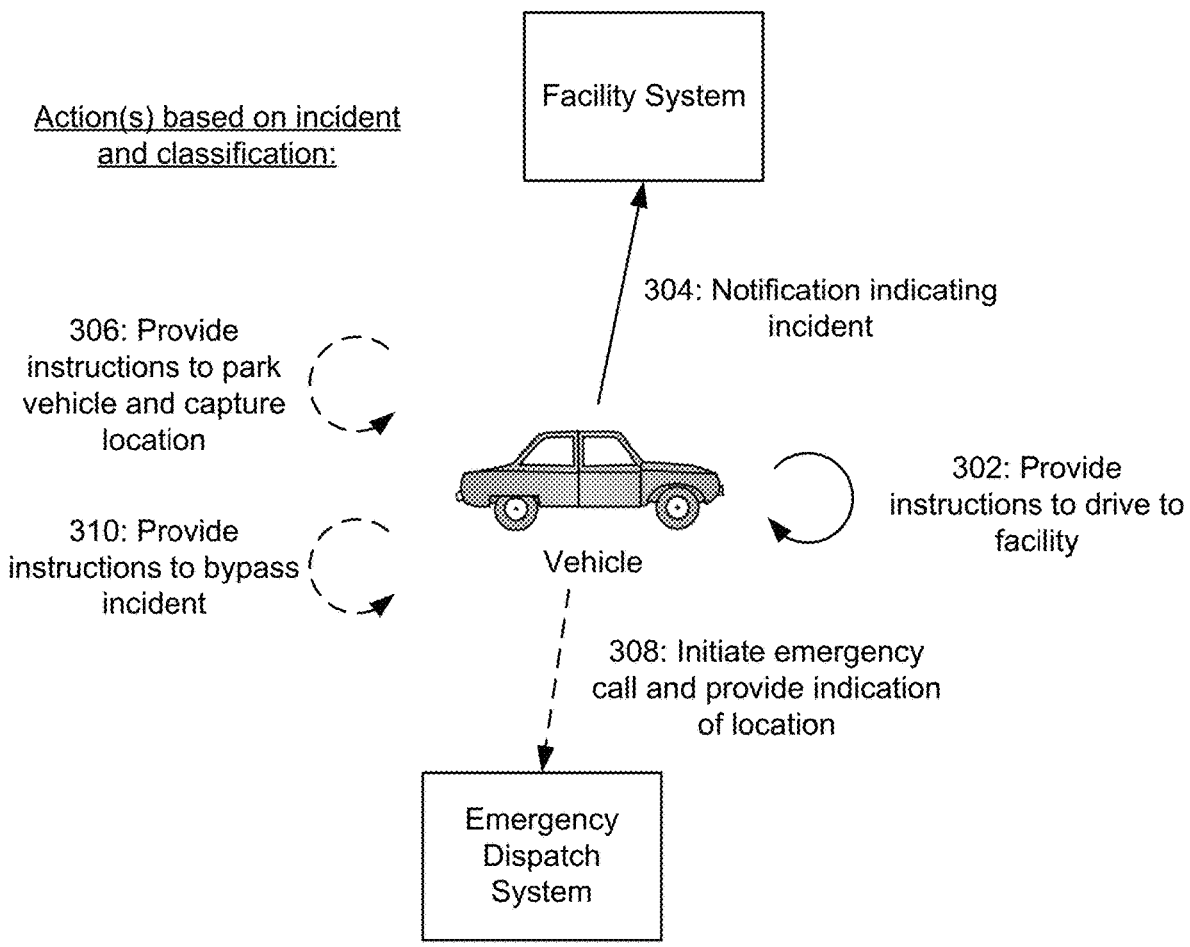
FIG. 3 is a diagram illustrating another example relating to performing vehicle actions based on an incident and a classification of the incident.

FIG. 3 is a diagram illustrating an example 300 relating to performing vehicle actions based on an incident and a classification of the incident. As shown in FIG. 3, example 300 includes a vehicle, a facility system, and an emergency dispatch system. These devices are described in more detail in connection with FIGS. 7-9. The first vehicle may communicate with the facility system and the emergency dispatch system via one or more access points (not shown in FIG. 3).

In some implementations, as described above in connection with reference number 208 of FIG. 2, the vehicle may receive, from the V2X system, an acknowledgement that indicates a classification of an incident associated with the vehicle. The acknowledgement may indicate whether the incident is associated with an emergency classification or a non-emergency classification. The vehicle may perform one or more vehicle actions based on the incident associated with the vehicle and based on the classification of the incident (e.g., road incident, vehicle accident, or medical emergency).

As shown by reference number 302, when performing the one or more vehicle actions, the vehicle may provide instructions to autonomously drive the vehicle to a facility (e.g., a hospital). The vehicle may provide the instructions to various sub-systems of the vehicle, such as a steering component, a braking component, an engine, actuators, and/or other autonomous driving components to perform these vehicle actions or maneuvers to autonomously drive the vehicle to the facility. In some implementations, the vehicle may provide the instructions to autonomously drive the vehicle to the facility based on the user input indicating that the incident is associated with the user of the vehicle, the classification of the incident (e.g., medical emergency that necessitates the user to receive medical care at the hospital), and/or a capability of the vehicle. In this case, the capability of the vehicle may indicate that the vehicle has autonomous driving capabilities.

As shown by reference number 304, the vehicle may transmit a notification to a facility system associated with the facility. The notification may indicate the incident. The notification may indicate user information associated with the user of the vehicle. The notification may allow the facility to prepare for the user's visit to the facility.

As shown by reference number 306, as an alternative to reference numbers 302 and 304, when performing the one or more vehicle actions, the vehicle may provide one or more instructions to autonomously park the vehicle. The vehicle may provide the instructions to various sub-systems of the vehicle, such as a steering component, a braking component, an engine, actuators, and/or other autonomous driving components to perform these vehicle actions or maneuvers to autonomously park the vehicle. In some implementations, the vehicle may provide the instructions to autonomously park the vehicle based on the user input indicating that the incident is associated with the user of the vehicle, the classification of the incident (e.g., medical emergency that necessitates the user to receive medical care at the hospital), and/or the capability of the vehicle. In this case, the capability of the vehicle may indicate that the vehicle does not have full autonomous driving capabilities, and thus the vehicle cannot drive itself to a facility. For a lower level autonomous driving capability (e.g., level 3), the autonomous driving capability of the vehicle may be limited to certain driving maneuvers, such as autonomous parking, and may not include full autonomous driving. Further, the vehicle may determine a location at which the vehicle is parked or is to be parked. The vehicle may determine the location using a navigation system of the vehicle.

As shown by reference number 308, the vehicle may initiate, with the emergency dispatch system, an emergency call based on the user input indicating that the incident is associated with the user of the vehicle. The vehicle may transmit, to the emergency dispatch system, an indication of the location at which the vehicle is parked or is to be parked. The emergency dispatch system may provide an indication to an emergency dispatch center, which may instruct an emergency vehicle to travel to the location of the vehicle and transport the user to the hospital via the emergency vehicle.

As shown by reference number 310, as an alternative to reference numbers 302 and 306, when performing the one or more vehicle actions, the vehicle may provide one or more instructions to autonomously drive the vehicle along a route that bypasses the incident based on the classification of the incident (e.g., road incident or vehicle accident) and a capability of the vehicle. The vehicle may provide the instructions to various sub-systems of the vehicle, such as a steering component, a braking component, an engine, actuators, and/or other autonomous driving components to perform these vehicle actions or maneuvers to autonomously drive the vehicle along the route that bypasses the incident. In this case, the capability of the vehicle may indicate that the vehicle has autonomous driving capabilities.

As indicated above, FIG. 3 is provided as an example. Other examples may differ from what is described with regard to FIG. 3.

Figure 4:
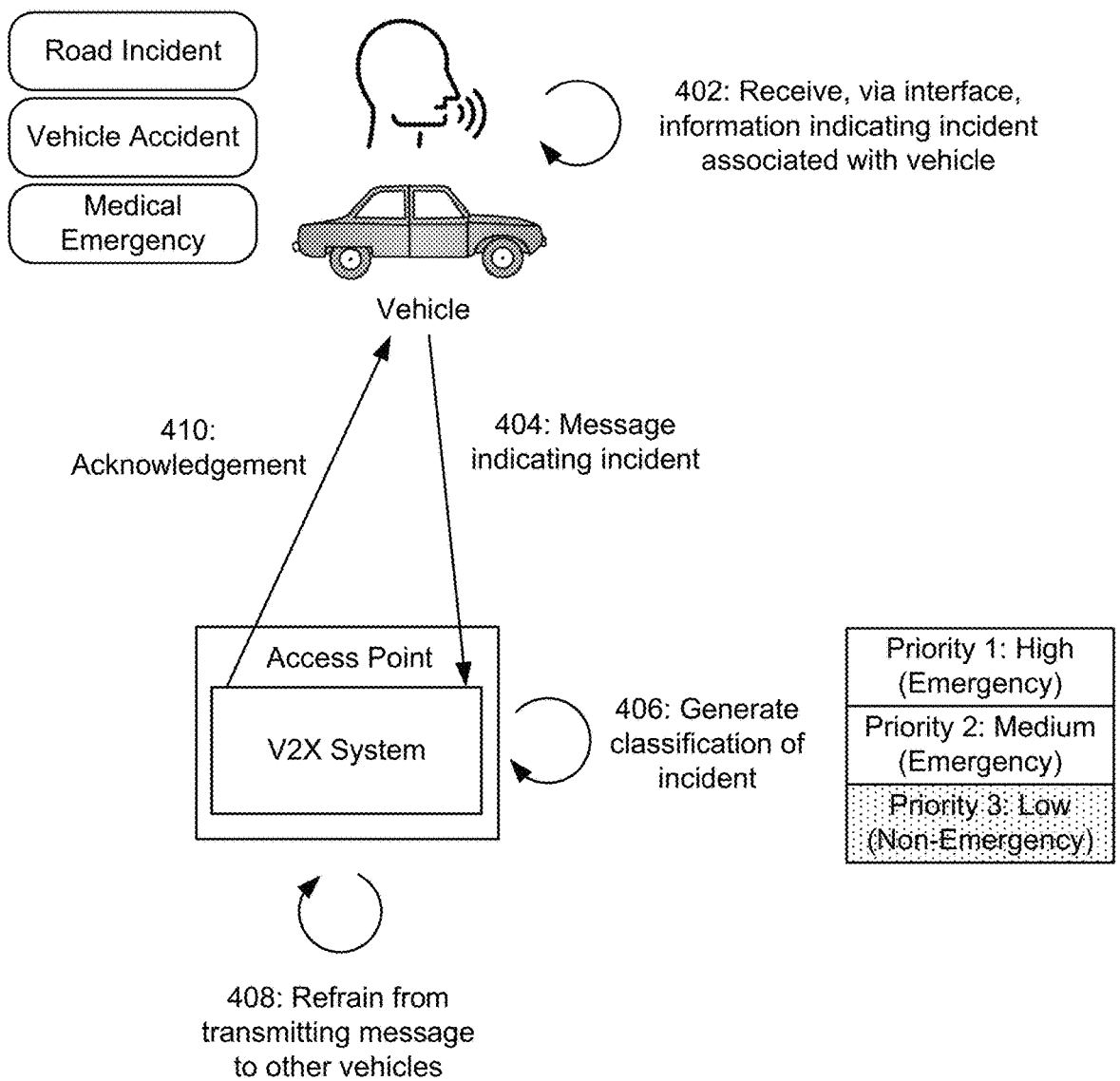
FIG. 4 is a diagram illustrating an example relating to generating a classification of an incident and refraining from transmitting messages to vehicles based on the classification of the incident.

FIG. 4 is a diagram illustrating an example 400 relating to generating a classification of an incident and refraining from transmitting messages to vehicles based on the classification of the incident. As shown in FIG. 4, example 400 includes a vehicle, a V2X system, and an access point (e.g., a base station). The V2X system may be associated with (e.g., integrated with or co-located with) the access point. Alternatively, the V2X system may not be co-located with access points (not shown in FIG. 4, but as shown in FIG. 6). These devices are described in more detail in connection with FIGS. 7-9.

As shown by reference numbers 402, 404, and 406, the vehicle may receive information indicating an incident associated with the vehicle, the vehicle may transmit a message to the V2X system indicating the incident, and the V2X system may generate a classification of the incident, respectively, in a similar manner as described above in connection with FIGS. 1-2.

As shown by reference number 408, the V2X system may refrain from transmitting one or more messages associated with the incident to other vehicles based on the classification being the non-emergency classification. For example, the V2X system may determine that the incident is associated with the non-emergency classification, and as a result, one or more messages indicating the incident do not need to be transmitted to the other vehicles. In this case, the incident associated with the vehicle may not have an effect on the other vehicles, so the other vehicles may not be informed of the incident.

As shown by reference number 410, the V2X system may transmit, to the vehicle, an acknowledgement based on the message indicating the incident. The acknowledgement may indicate that the incident has been classified as a non-emergency, and as a result, the other vehicles are not to be informed of the incident. At this point, the user of the vehicle may call an emergency service if desired.

As indicated above, FIG. 4 is provided as an example. Other examples may differ from what is described with regard to FIG. 4.

Figure 5:
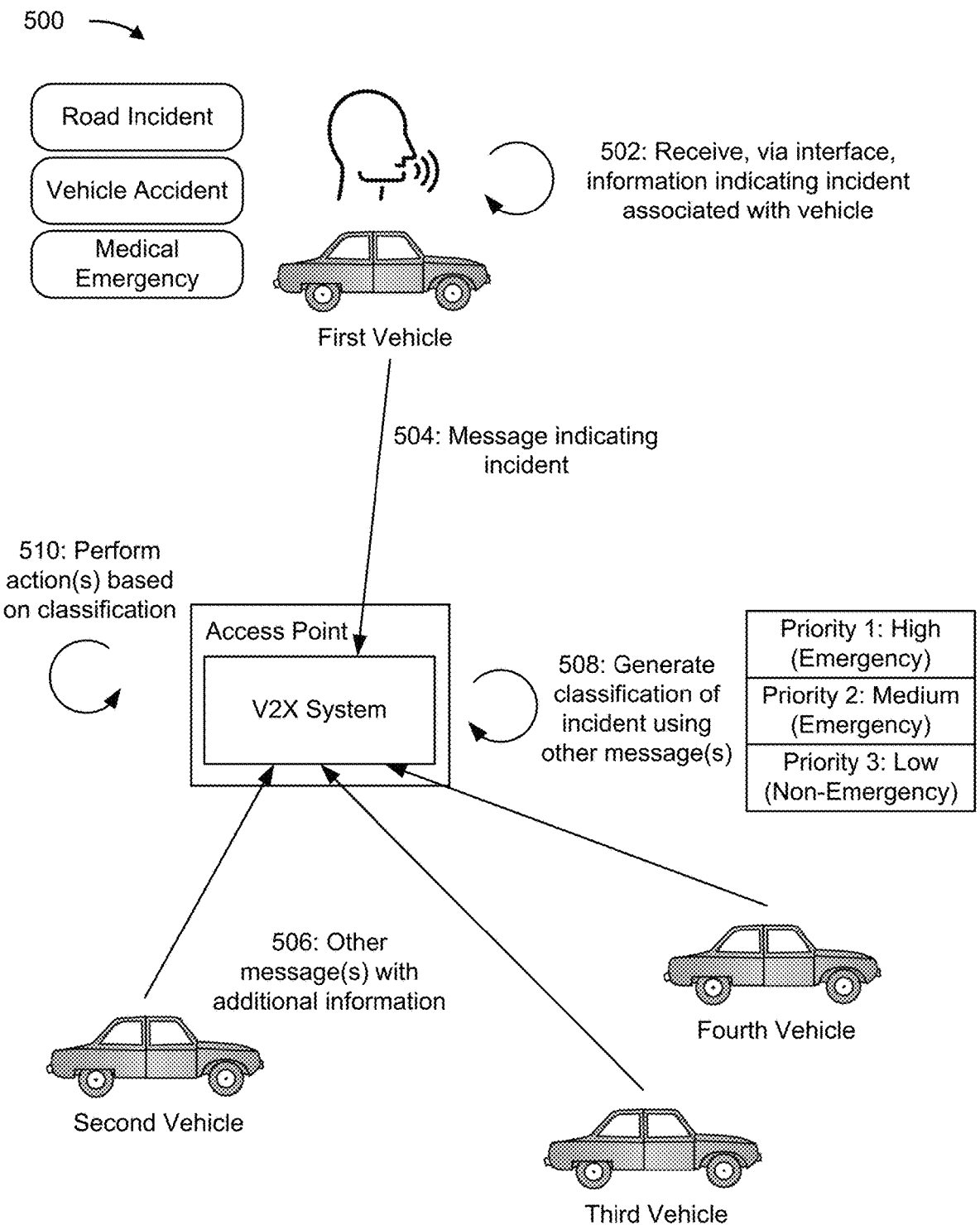
FIG. 5 is a diagram illustrating an example relating to generating a classification of an incident based on messages received from a plurality of vehicles.

FIG. 5 is a diagram illustrating an example 500 relating to generating a classification of an incident based on messages received from a plurality of vehicles. As shown in FIG. 5, example 500 includes vehicles such as a first vehicle, a second vehicle, a third vehicle, and a fourth vehicle, a V2X system, and an access point (e.g., a base station). The V2X system may be associated with (e.g., integrated with or co-located with) the access point. Alternatively, the V2X system may not be co-located with access points (not shown in FIG. 5, but as shown in FIG. 6). These devices are described in more detail in connection with FIGS. 7-9.

As shown by reference numbers 502 and 504, the vehicle may receive information indicating an incident associated with the vehicle, and the vehicle may transmit a message to the V2X system indicating the incident, respectively, in a similar manner as described above in connection with FIGS. 1, 2, and 4.

As shown by reference number 506, the V2X system may receive other messages from other vehicles, such as the second vehicle, the third vehicle, and the fourth vehicle. The other messages may include additional information that may or may not corroborate the message indicating the incident associated with the first vehicle. For example, numerous vehicles may send messages that indicate a vehicle accident on a highway, which may concur with a message provided by the first vehicle that indicates the same vehicle accident on the highway.

As shown by reference number 508, the V2X system may generate a classification of the incident based on the incident associated with the vehicle. The V2X system may generate the classification based on the message received from the first vehicle, and based on the other messages received from the other vehicles. The classification may be an emergency classification or a non-emergency classification depending on the incident associated with the vehicle and depending on whether the incident is corroborated by the other messages received from the other vehicles.

As shown by reference number 510, the V2X system may perform one or more actions based on the classification. In some implementations, the V2X system may identify vehicles, such as the second vehicle, the third vehicle, and/or the fourth vehicle, that are within a defined range from the first vehicle or that are along a route associated with the first vehicle. The V2X system may transmit, to the vehicles and based on the classification of the incident being the emergency classification, one or more messages that indicate one or more vehicle actions to be performed by the vehicles based on the incident associated with the first vehicle. In some implementations, the V2X system may refrain from transmitting the one or more messages associated with the incident to the vehicles based on the classification being the non-emergency classification.

As indicated above, FIG. 5 is provided as an example. Other examples may differ from what is described with regard to FIG. 5.

FIG. 6 is a diagram illustrating an example 600 relating to transmitting messages to a plurality of vehicles via one or more access points (e.g., one or more base stations). As shown in FIG. 6, example 600 includes vehicles such as a first vehicle, a second vehicle, a third vehicle, and a fourth vehicle, a V2X system, and access points, such as a first access point, a second access point, and a third access point. The access points may not be associated with (e.g., not integrated with or not co-located with) the access points. These devices are described in more detail in connection with FIGS. 7-9.

In some implementations, the V2X system may be external to the one or more access points. For example, the V2X system may be in a core network, or the V2X system may be associated with an application server that communicates with the one or more access points via the core network. The V2X system may be able to communicate with the one or more access points, where each access point may serve a geographic region in which a plurality of vehicles are located. For example, the first access point may be associated with the first vehicle and the second vehicle, the second access point may be associated with the third vehicle, and the third access point may be associated with the fourth vehicle.

As shown by reference number 602, the first vehicle may transmit, to the first access point, a message indicating an incident associated with the first vehicle. The first vehicle may determine an occurrence of the incident based on user input received at the first vehicle. As shown by reference number 604, the first access point may forward the message to the V2X system.

As shown by reference number 606, the V2X system may generate a classification of the incident and perform one or more actions based on the classification of the incident, in a similar manner as described above in connection with FIGS. 1, 2, 4, and/or 5.

As shown by reference number 608, the V2X system may transmit, to the one or more access points, one or more messages indicating the incident and instructions for the one or more access points to transmit (e.g., broadcast) the one or more messages, such that vehicles that are within a defined distance from the one or more access points may receive the one or more messages.

As shown by reference numbers 610, the first access point may transmit the one or more messages based on the instructions received at the first access point from the V2X system. The one or more messages, as transmitted by the first access point, may be received by the second vehicle, which may be located in a geographic region that is served by the first access point. In this case, the first access point may serve the geographic region in which both the first vehicle and the second vehicle are located. As a result, the second vehicle may become aware of the incident associated with the first vehicle.

As shown by reference numbers 612, 614, the second access point and the third access point may transmit the one or more messages based on the instructions received at the second access point and the third access point, respectively. The one or more messages, as transmitted by the second access point and the third access point, may be received by the third vehicle and the fourth vehicle, respectively. As a result, the third vehicle and the fourth vehicle may become aware of the incident associated with the first vehicle, even though the third vehicle and the fourth vehicle are associated with different access points as compared to the first vehicle.

In some implementations, the V2X system may identify the first access point that serves a geographic region in which the first vehicle is located and/or a geographic region in which the incident occurs. The V2X system may instruct the first access point to broadcast a message to a plurality of vehicles (e.g., including the second vehicle) in a service area of the first access point. For example, the V2X system may provide, to the first access point, a message that indicates a location of the first vehicle associated with the incident, the classification associated with the incident, and/or vehicle actions to be performed by the plurality of vehicles in the service area of the first access point. The first access point, after receiving the message from the V2X system, may broadcast a message containing information included in the message received at the access point from the V2X system. The V2X system may not target specific vehicles at a more granular level than vehicles served by the first access point. As a result of the broadcast, the plurality of vehicles in the service aera of the first access point may be able to receive that information and perform the vehicle actions accordingly.

In some implementations, the V2X system may identify specific access points and/or a number of access points to notify based on the type of incident and/or a location at which the incident occurred. For example, the V2X system may identify a single access point to notify when the incident is relatively localized and does not have a wide-ranging impact, such as a fallen tree on a rural road. The V2X system may instruct the single access point to broadcast a message to a plurality of vehicles in a service area of the single access point. As another example, the V2X system may identify multiple access points to notify when the incident has a wider-ranging impact, such as a crash on a highway. The V2X system may instruct the multiple access points to each broadcast a message to service areas associated with the multiple access points.

In some implementations, the second vehicle may receive the message containing the information from the first access point. The second vehicle may determine whether to perform the vehicle actions indicated in the message, or whether to ignore the vehicle actions indicated in the message. The second vehicle may determine whether to perform the vehicle actions or ignore the vehicle actions based on a distance between the second vehicle and the first vehicle and/or the incident associated with the first vehicle. For example, the second vehicle may determine, based on a route taken by the second vehicle to travel to a destination, that the second vehicle may not be in proximity to the first vehicle and/or the incident associated with the first vehicle. In this case, the second vehicle may ignore the message received from the first access point.

In some implementations, the first access point may not broadcast the message to the plurality of vehicles in the service area of the first access point. Rather, the first access point may identify a subset of vehicles in the vehicles in the service aera. The first access point may identify the subset of vehicles based on a location of the subset of vehicles in relation to the location of the first vehicle and/or the incident. The first access point may transmit the message to only the subset of vehicles (e.g., using directional communications and/or beams), such that other vehicles in the service area may not receive the message. Transmitting the message to the subset of vehicles may result in less network traffic. Further, by not transmitting the message to the other vehicles, the other vehicles may not consume computing resources associated with receiving the message and determining to ignore the message.

As indicated above, FIG. 6 is provided as an example. Other examples may differ from what is described with regard to FIG. 6.

Figure 7:
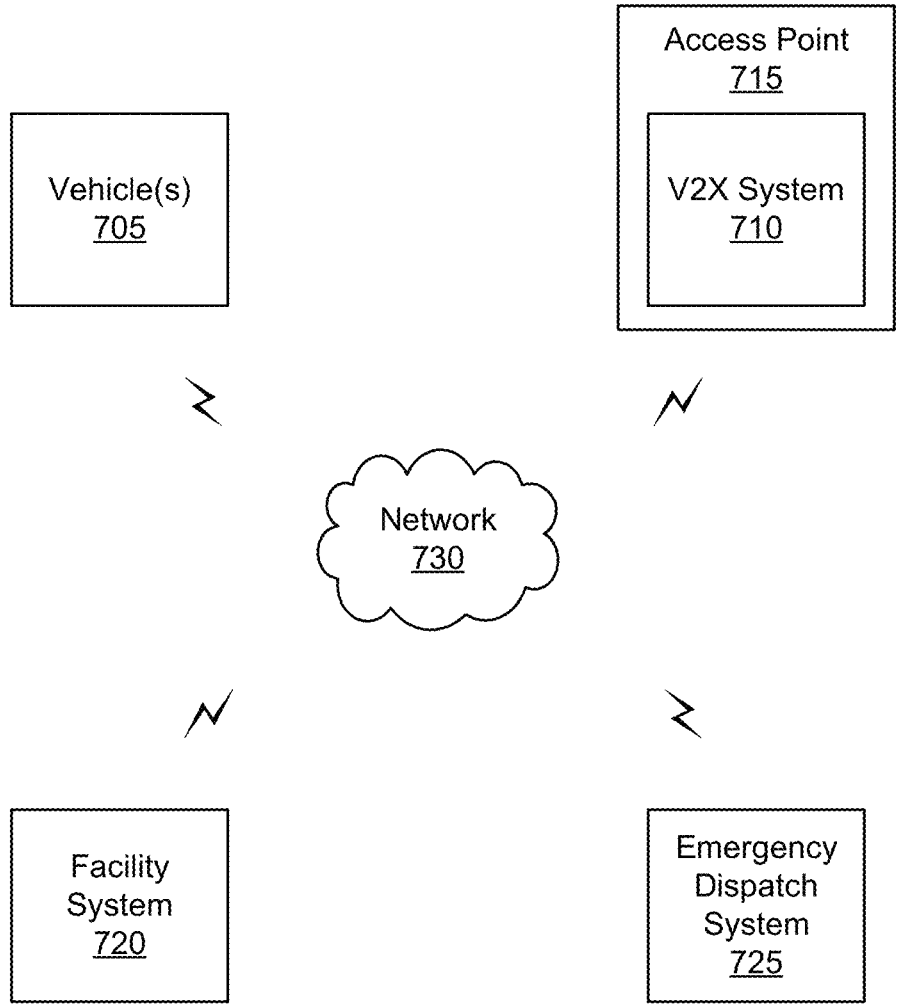
FIGS. 7-8 are diagrams of example environments in which systems and/or methods described herein may be implemented.

FIG. 7 is a diagram of an example environment 700 in which systems and/or methods described herein may be implemented. As shown in FIG. 7, environment 700 may include one or more vehicles 705, a V2X system 710, an access point 715, a facility system 720, an emergency dispatch system 725, and a network 730. Devices of environment 700 may interconnect via wired connections, wireless connections, or a combination of wired and wireless connections.

A vehicle 705 include one or more devices capable of receiving, generating, storing, processing, and/or providing information associated with V2X communication based on user input, as described elsewhere herein. A vehicle 705 may include any machine capable of transporting people, such as an automobile, a motorcycle, a bus, a train, a scooter, a truck, and so on. A vehicle 705 may have autonomous driving capabilities. For example, a vehicle 705 may include specialized hardware, such as sensors, radar, light detection and ranging (LIDAR), and so on to provide the autonomous driving capabilities. A vehicle 705 may include a user interface to receive user input. For example, a vehicle 705 may include a display screen for receiving touch input, and/or a microphone for receiving voice input.

The V2X system 710 includes one or more devices capable of receiving, generating, storing, processing, providing, and/or routing information associated with V2X communication based on user input, as described elsewhere herein. The V2X system 710 may include a communication device and/or a computing device. For example, the V2X system 710 may include a server, such as an application server, a client server, a web server, a database server, a host server, a proxy server, a virtual server (e.g., executing on computing hardware), or a server in a cloud computing system. In some implementations, the V2X system 710 includes computing hardware used in a cloud computing environment.

The V2X system 710 may be associated with the access point 715. For example, the V2X system 710 may be co-located or integrated with the access point 715, or the V2X system 710 may be in close proximity (e.g., on site) to the access point 715. The access point 715 may be a base station, a wireless access point, a wireless wide area network (WWAN) access point, a wireless local area network (WLAN) access point (e.g., a Wi-Fi access point), a network node, or another type of receiving/transmitting node that serves as a hub of the network 730.

The facility system 720 includes one or more devices capable of receiving, generating, storing, processing, providing, and/or routing information associated with V2X communication based on user input, as described elsewhere herein. The facility system 720 may include a communication device and/or a computing device. For example, the facility system 720 may include a server, such as an application server, a client server, a web server, a database server, a host server, a proxy server, a virtual server (e.g., executing on computing hardware), or a server in a cloud computing system. In some implementations, the facility system 720 includes computing hardware used in a cloud computing environment.

The emergency dispatch system 725 includes one or more devices capable of receiving, generating, storing, processing, providing, and/or routing information associated with V2X communication based on user input, as described elsewhere herein. The emergency dispatch system 725 may include a communication device and/or a computing device. For example, the emergency dispatch system 725 may include a server, such as an application server, a client server, a web server, a database server, a host server, a proxy server, a virtual server (e.g., executing on computing hardware), or a server in a cloud computing system. In some implementations, the emergency dispatch system 725 includes computing hardware used in a cloud computing environment.

The network 730 includes one or more wired and/or wireless networks. For example, the network 730 may include a cellular network, a public land mobile network, a local area network, a wide area network, a metropolitan area network, a telephone network, a private network, the Internet, and/or a combination of these or other types of networks. The network 730 enables communication among the devices of environment 700.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
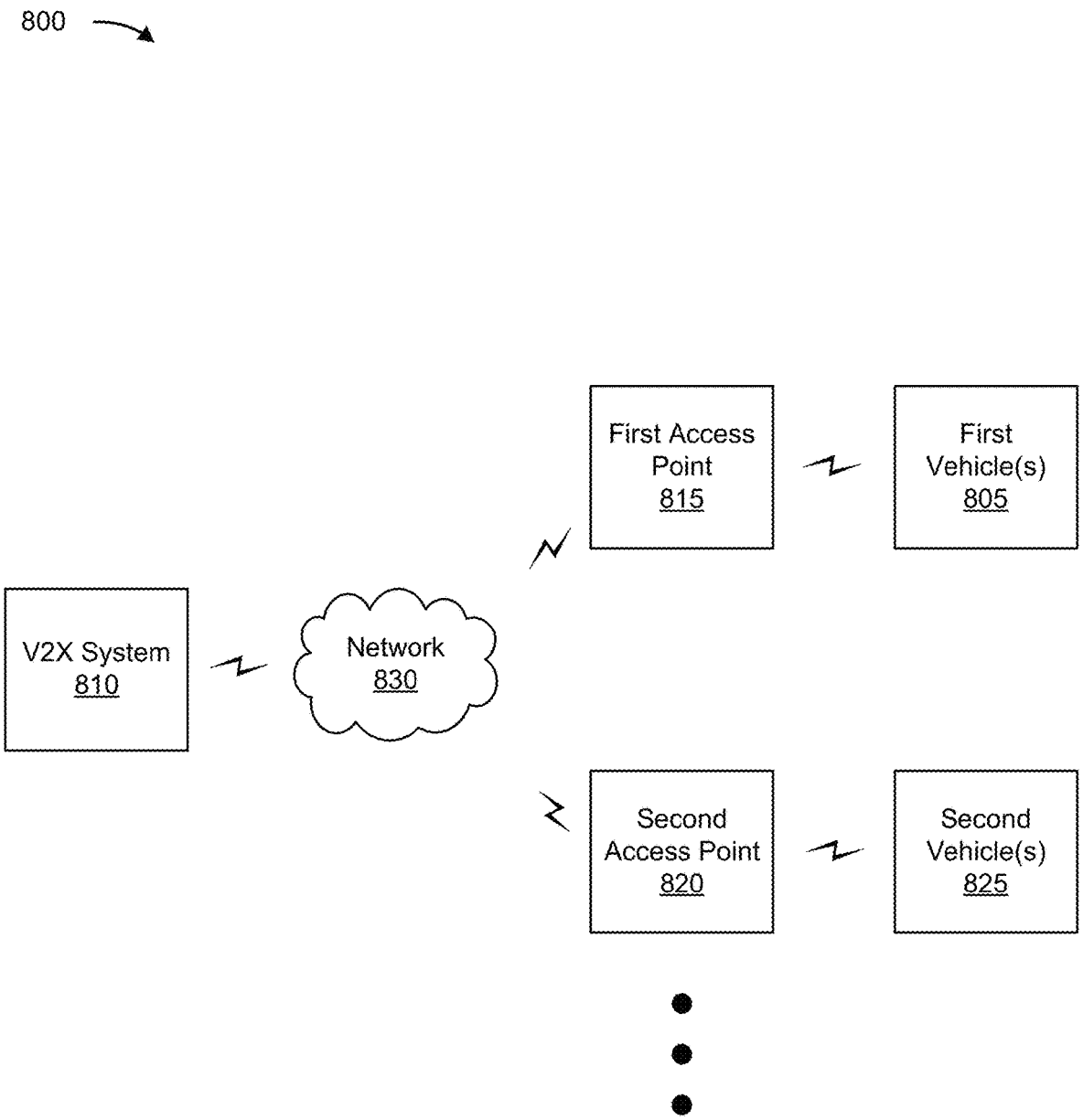

FIG. 8 is a diagram of an example environment 800 in which systems and/or methods described herein may be implemented. As shown in FIG. 8, environment 800 may include one or more first vehicles 805, one or more second vehicles 825, a V2X system 810, a first access point 815, a second access point 820, and a network 830. The one or more first vehicles 805 and the one or more second vehicles 825 may correspond to the one or more vehicles 705, as described in connection with FIG. 7. The first access point 815 and the second access point 820 may correspond to the access point 715, as described in connection with FIG. 7. Similarly, the V2X system 810 and the network 830 may correspond to the V2X system 710 and the network 730, respectively, as described in connection with FIG. 7. Devices of environment 800 may interconnect via wired connections, wireless connections, or a combination of wired and wireless connections.

In the environment 800, the V2X system 810 may communicate via the network 830 with a plurality of access points, such as the first access point 815 and the second access point 820. The first access point 815 may be associated with the first vehicles 805, and the second access point 820 may be associated with the second vehicles 825, where the first vehicles 805 and the second vehicles 825 may correspond to different sets of vehicles. In other words, the first access point 815 may serve a first geographic region in which the first vehicles 805 are located, and the second access point 820 may serve a second geographic region in which the second vehicles 825 are located. The V2X system 810 and first vehicles 805 may communicate via the first access point 815, and the V2X system 810 and the second vehicles 825 may communicate via the second access point 820.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
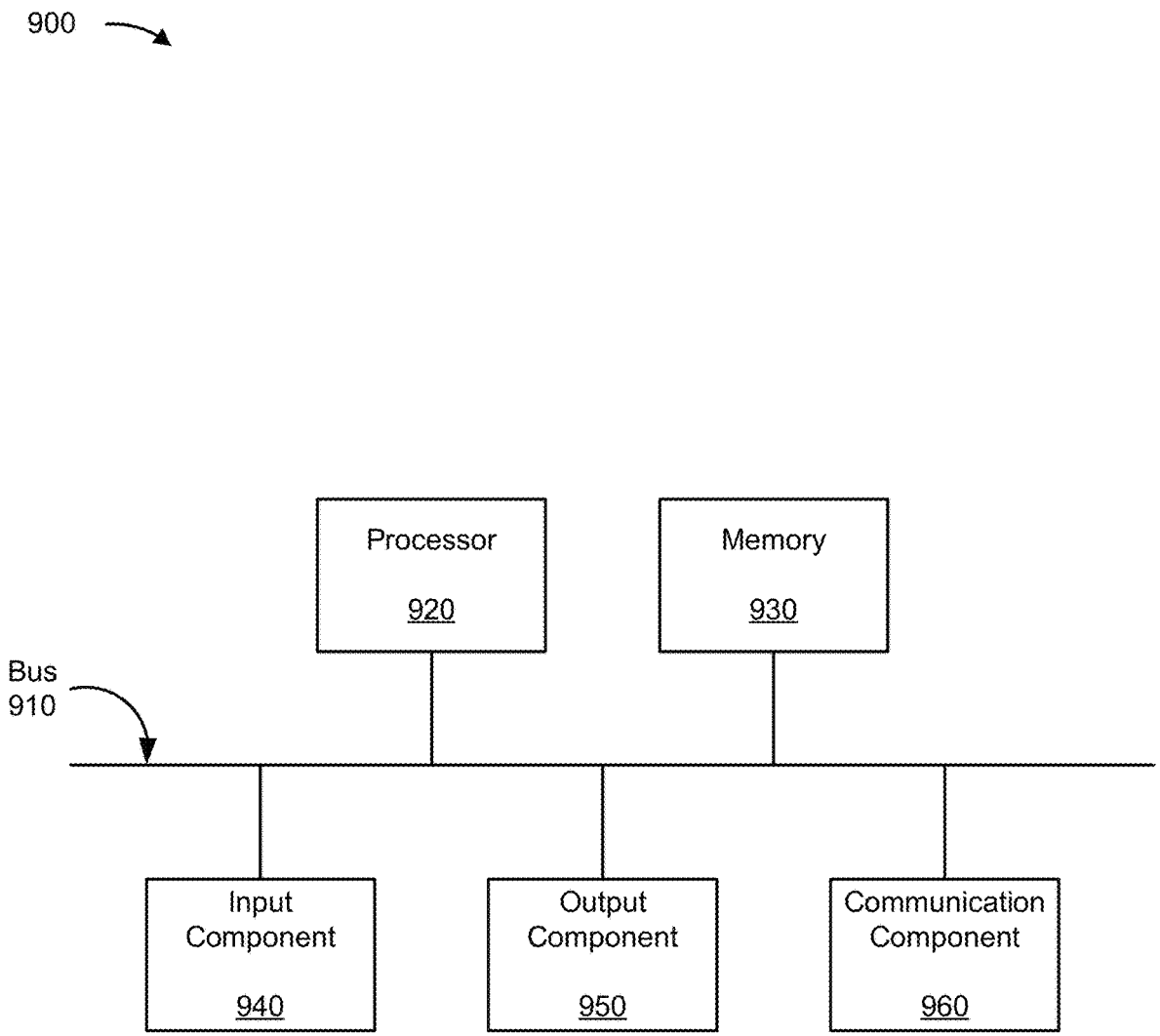
FIG. 9 is a diagram of example components of one or more devices of FIGS. 7-8.

FIG. 9 is a diagram of example components of a device 900, which may correspond to a vehicle 705, the V2X system 710, the access point 715, the facility system 720, the emergency dispatch system 725, a first vehicle 805, a second vehicle 825, the V2X system 810, the first access point 815, and/or the second access point 820. In some implementations, a vehicle 705, the V2X system 710, the access point 715, the facility system 720, the emergency dispatch system 725, a first vehicle 805, a second vehicle 825, the V2X system 810, the first access point 815, and/or the second access point 820 may include one or more devices 900 and/or one or more components of device 900. As shown in FIG. 9, device 900 may include a bus 910, a processor 920, a memory 930, an input component 940, an output component 950, and a communication component 960.

Bus 910 includes one or more components that enable wired and/or wireless communication among the components of device 900. Bus 910 may couple together two or more components of FIG. 9, such as via operative coupling, communicative coupling, electronic coupling, and/or electric coupling. Processor 920 includes a central processing unit, a graphics processing unit, a microprocessor, a controller, a microcontroller, a digital signal processor, a field-programmable gate array, an application-specific integrated circuit, and/or another type of processing component. Processor 920 is implemented in hardware, firmware, or a combination of hardware and software. In some implementations, processor 920 includes one or more processors capable of being programmed to perform one or more operations or processes described elsewhere herein.

Memory 930 includes volatile and/or nonvolatile memory. For example, memory 930 may include random access memory (RAM), read only memory (ROM), a hard disk drive, and/or another type of memory (e.g., a flash memory, a magnetic memory, and/or an optical memory). Memory 930 may include internal memory (e.g., RAM, ROM, or a hard disk drive) and/or removable memory (e.g., removable via a universal serial bus connection). Memory 930 may be a non-transitory computer-readable medium. Memory 930 stores information, instructions, and/or software (e.g., one or more software applications) related to the operation of device 900. In some implementations, memory 930 includes one or more memories that are coupled to one or more processors (e.g., processor 920), such as via bus 910.

Input component 940 enables device 900 to receive input, such as user input and/or sensed input. For example, input component 940 may include a touch screen, a keyboard, a keypad, a mouse, a button, a microphone, a switch, a sensor, a global positioning system sensor, an accelerometer, a gyroscope, and/or an actuator. Output component 950 enables device 900 to provide output, such as via a display, a speaker, and/or a light-emitting diode. Communication component 960 enables device 900 to communicate with other devices via a wired connection and/or a wireless connection. For example, communication component 960 may include a receiver, a transmitter, a transceiver, a modem, a network interface card, and/or an antenna.

Device 900 may perform one or more operations or processes described herein. For example, a non-transitory computer-readable medium (e.g., memory 930) may store a set of instructions (e.g., one or more instructions or code) for execution by processor 920. Processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry is used instead of or in combination with the instructions to perform one or more operations or processes described herein. Additionally, or alternatively, processor 920 may be configured to perform one or more operations or processes described herein. Thus, implementations described herein are not limited to any specific combination of hardware circuitry and software.

The number and arrangement of components shown in FIG. 9 are provided as an example. Device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

Figure 10:
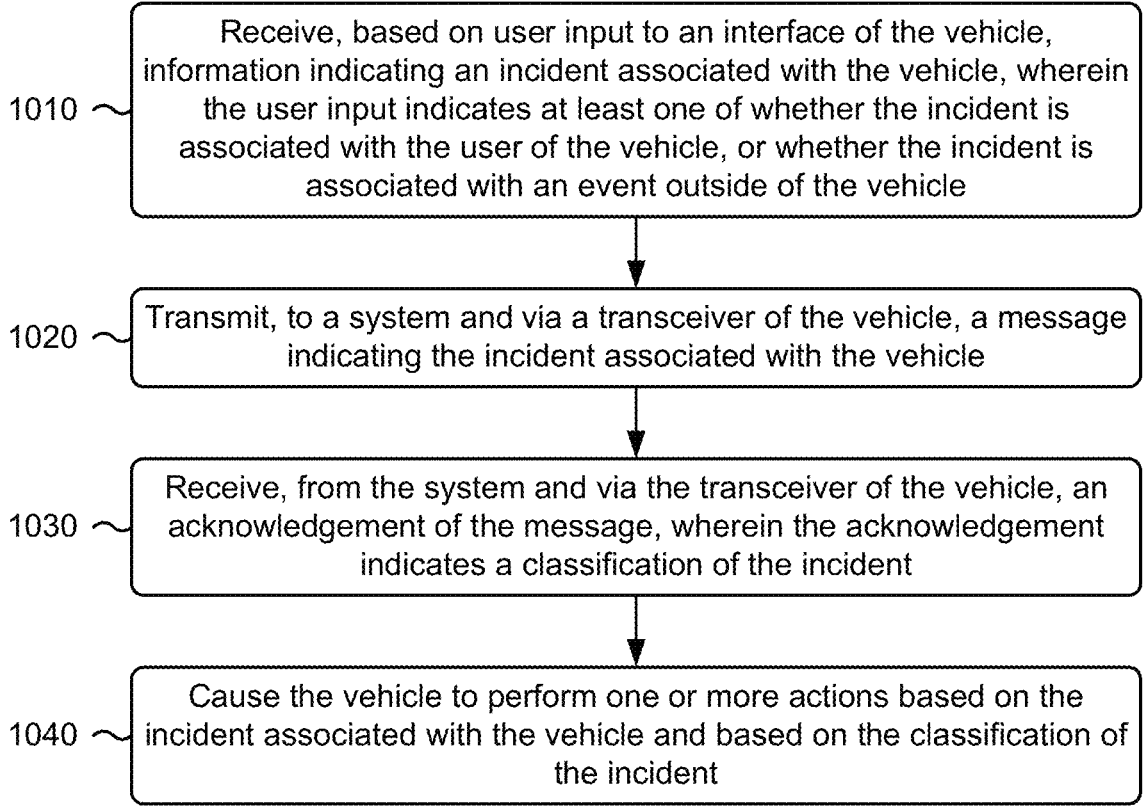
FIGS. 10-11 are flowcharts of example processes relating to V2X communication based on user input.

FIG. 10 is a flowchart of an example process 1000 associated with V2X communication based on user input. In some implementations, one or more process blocks of FIG. 10 may be performed by a device of a vehicle (e.g., vehicle 705, first vehicle 805, and/or second vehicle 825). In some implementations, one or more process blocks of FIG. 10 may be performed by another device or a group of devices separate from or including the device of the vehicle, such as V2X system 710, access point 715, emergency dispatch system 725, and/or facility system 720 (and/or corresponding devices of FIG. 8). Additionally, or alternatively, one or more process blocks of FIG. 10 may be performed by one or more components of device 900, such as processor 920, memory 930, input component 940, output component 950, and/or communication component 960.

As shown in FIG. 10, process 1000 may include receiving, based on user input to an interface of the vehicle, information indicating an incident associated with the vehicle, wherein the user input indicates at least one of: whether the incident is associated with the user of the vehicle, or whether the incident is associated with an event outside of the vehicle (block 1010). As further shown in FIG. 10, process 1000 may include transmitting, to a system and via a transceiver of the vehicle, a message indicating the incident associated with the vehicle (block 1020). As further shown in FIG. 10, process 1000 may include receiving, from the system and via the transceiver of the vehicle, an acknowledgement of the message, wherein the acknowledgement indicates a classification of the incident (block 1030). As further shown in FIG. 10, process 1000 may include causing the vehicle to perform one or more actions based on the incident associated with the vehicle and based on the classification of the incident (block 1040).

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
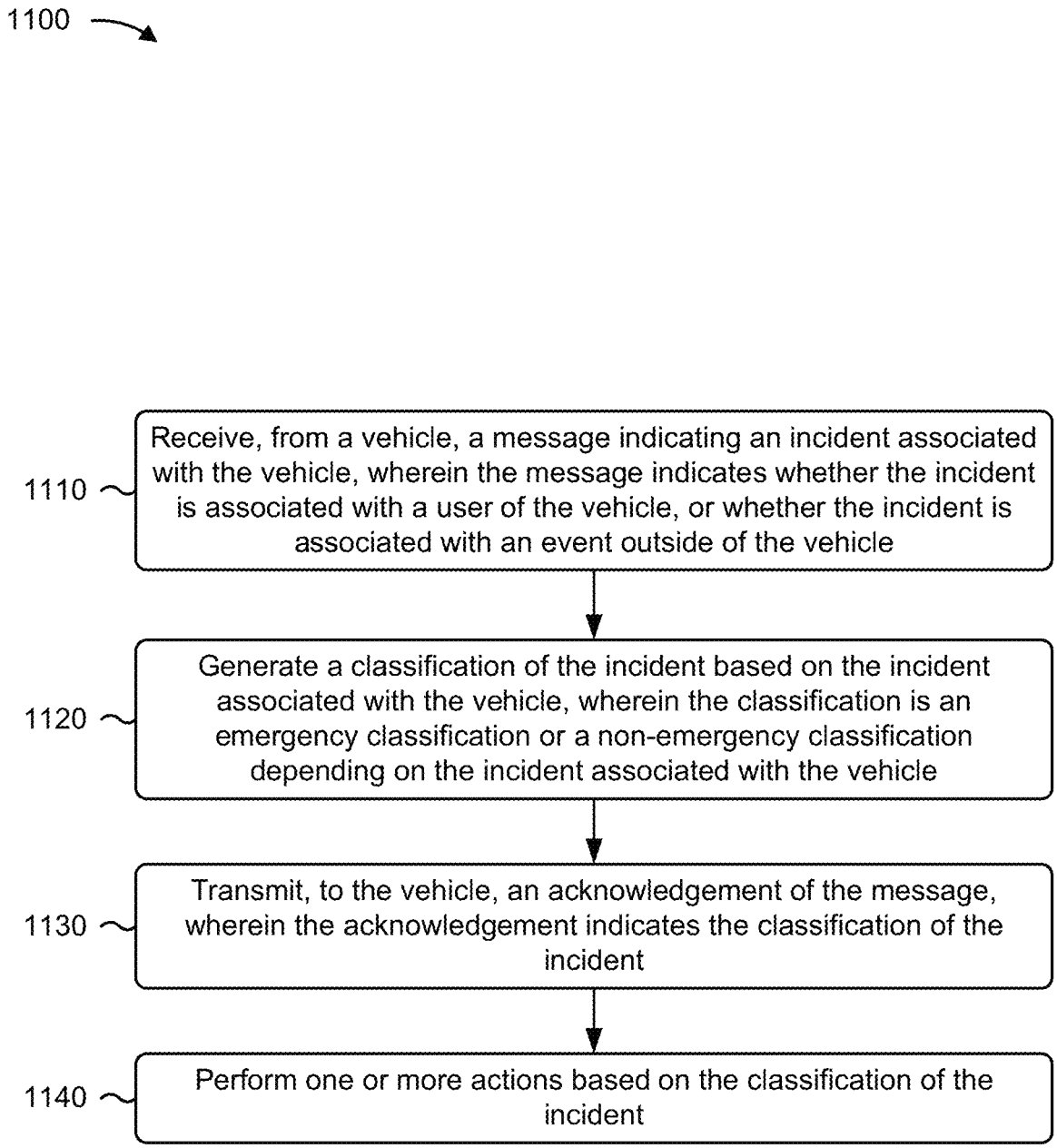

FIG. 11 is a flowchart of an example process 1100 associated with V2X communication based on user input. In some implementations, one or more process blocks of FIG. 11 may be performed by a system (e.g., V2X system 710 and/or V2X system 810). In some implementations, one or more process blocks of FIG. 11 may be performed by another device or a group of devices separate from or including the system, such as a vehicle 705, access point 715, facility system 720, and/or emergency dispatch system 725. Additionally, or alternatively, one or more process blocks of FIG. 11 may be performed by one or more components of device 900, such as processor 920, memory 930, input component 940, output component 950, and/or communication component 960.

As shown in FIG. 11, process 1100 may include receiving, from a vehicle, a message indicating an incident associated with the vehicle, wherein the message indicates: whether the incident is associated with a user of the vehicle, or whether the incident is associated with an event outside of the vehicle (block 1110). As further shown in FIG. 11, process 1100 may include generating a classification of the incident based on the incident associated with the vehicle, wherein the classification is an emergency classification or a non-emergency classification depending on the incident associated with the vehicle (block 1120). As further shown in FIG. 11, process 1100 may include transmitting, to the vehicle, an acknowledgement of the message, wherein the acknowledgement indicates the classification of the incident (block 1130). As further shown in FIG. 11, process 1100 may include performing one or more actions based on the classification of the incident (block 1140).

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

In some implementations, a device associated with a vehicle includes an interface configured to receive user input from a user of the vehicle; a transceiver; a memory; and one or more processors, coupled to the memory, configured to: receive, based on the user input to the interface, information indicating an incident associated with the vehicle, wherein the user input indicates at least one of: whether the incident is associated with the user of the vehicle, or whether the incident is associated with an event outside of the vehicle; transmit, to a system and via the transceiver of the device, a message indicating the incident associated with the vehicle; receive, from the system and via the transceiver of the device, an acknowledgement of the message, wherein the acknowledgement indicates a classification of the incident; and cause the vehicle to perform one or more actions based on the incident associated with the vehicle and based on the classification of the incident.

In some implementations, a system includes a memory; and one or more processors, coupled to the memory, configured to: receive, from a vehicle, a message indicating an incident associated with the vehicle, wherein the message indicates: whether the incident is associated with a user of the vehicle, or whether the incident is associated with an event outside of the vehicle; generate a classification of the incident based on the incident associated with the vehicle, wherein the classification is an emergency classification or a non-emergency classification depending on the incident associated with the vehicle; transmit, to the vehicle, an acknowledgement of the message, wherein the acknowledgement indicates the classification of the incident; and perform one or more actions based on the classification of the incident.

In some implementations, a method includes receiving, based on user input to an interface of the vehicle, information indicating an incident associated with the vehicle, wherein the user input indicates at least one of: whether the incident is associated with the user of the vehicle, or whether the incident is associated with an event outside of the vehicle; transmitting, to a system and via a transceiver of the vehicle, a message indicating the incident associated with the vehicle; receiving, from the system and via the transceiver of the vehicle, an acknowledgement of the message, wherein the acknowledgement indicates a classification of the incident; and causing the vehicle to perform one or more actions based on the incident associated with the vehicle and based on the classification of the incident.

In some implementations, a method includes receiving, at a system from a vehicle, a message indicating an incident associated with the vehicle, wherein the message indicates: whether the incident is associated with a user of the vehicle, or whether the incident is associated with an event outside of the vehicle; generating a classification of the incident based on the incident associated with the vehicle, wherein the classification is an emergency classification or a non-emergency classification depending on the incident associated with the vehicle; transmitting, to the vehicle, an acknowledgement of the message, wherein the acknowledgement indicates the classification of the incident; and performing one or more actions based on the classification of the incident.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. Many of these features may be combined in ways not specifically recited in the claims and/or disclosed in the specification. The disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A device associated with a vehicle, comprising:
an interface configured to receive user input from a user of the vehicle;
a transceiver;
a memory; and
one or more processors, coupled to the memory, configured to:
receive, based on the user input to the interface, information indicating an incident associated with the vehicle, wherein the user input indicates whether the incident is associated with the user of the vehicle or an event outside of the vehicle;
transmit, to a system and via the transceiver of the device, a message indicating the incident associated with the vehicle;
receive, from the system and via the transceiver of the device, an acknowledgement of the message, wherein the acknowledgement indicates a classification of the incident; and
cause the vehicle to perform one or more actions based on the incident associated with the vehicle and based on the classification of the incident.

2. The device of claim 1, wherein the interface is configured to receive the user input as a voice input.

3. The device of claim 1, wherein the one or more processors, to cause the vehicle to perform the one or more actions, are configured to:
provide one or more instructions to autonomously drive the vehicle to a facility based on:
the user input indicating that the incident is associated with the user of the vehicle,
the classification of the incident, and
a capability of the vehicle.

4. The device of claim 3, wherein the one or more processors are further configured to:
transmit, via the transceiver, a notification to a facility system associated with the facility, wherein the notification indicates the incident.

5. The device of claim 1, wherein the one or more processors, to cause the vehicle to perform the one or more actions, are configured to:
provide one or more instructions to autonomously park the vehicle based on:
the user input indicating that the incident is associated with the user of the vehicle,
the classification of the incident, and
a capability of the vehicle.

6. The device of claim 5, wherein the one or more processors are further configured to:
determine a location at which the vehicle is parked or is to be parked;
initiate, with an emergency dispatch system, an emergency call based on the user input indicating that the incident is associated with the user of the vehicle; and
transmit, to the emergency dispatch system and via the transceiver, an indication of the location at which the vehicle is parked or is to be parked.

7. The device of claim 1, wherein, based on the user input indicating that the incident is associated with the event outside the vehicle, the message indicating the incident associated with the vehicle includes one or more of:
an image associated with the incident,
a video associated with the incident, or
sensor information detected by one or more sensors associated with the vehicle.

8. The device of claim 1, wherein the one or more processors, to cause the vehicle to perform the one or more actions, are configured to:
provide one or more instructions to autonomously drive the vehicle along a route that bypasses the incident based on the classification of the incident and a capability of the vehicle.

9. The device of claim 1, wherein the message indicating the incident associated with the vehicle further indicates a location associated with the incident.

10. The device of claim 1, wherein the classification of the incident is associated with a severity level, and wherein the severity level is based on whether the classification corresponds to an emergency classification or a non-emergency classification.

11. A system, comprising:
a memory; and
one or more processors, coupled to the memory, configured to:
receive, from a vehicle, a message indicating an incident associated with the vehicle, wherein the message is based on user input that indicates whether the incident is associated with a user of the vehicle or an event outside of the vehicle;
generate a classification of the incident based on the incident associated with the vehicle, wherein the classification is an emergency classification or a non-emergency classification depending on the incident associated with the vehicle;
transmit, to the vehicle, an acknowledgement of the message, wherein the acknowledgement indicates the classification of the incident; and
perform one or more actions based on the classification of the incident.

12. The system of claim 11, wherein the one or more processors, to perform the one or more actions, are configured to:
identify a plurality of other vehicles that are within a defined range from the vehicle or that are along a route associated with the vehicle; and
transmit, to the plurality of other vehicles and based on the classification of the incident as the emergency classification, one or more messages that indicate one or more vehicle actions to be performed by the plurality of other vehicles based on the incident associated with the vehicle.

13. The system of claim 11, wherein the one or more processors, to perform the one or more actions, are configured to:
refrain from transmitting one or more messages associated with the incident to a plurality of other vehicles based on the classification being the non-emergency classification.

14. The system of claim 11, wherein the one or more processors are configured to generate the classification based on other messages received from a plurality of other vehicles, wherein the other messages provide additional information that corroborates the message indicating the incident associated with the vehicle.

15. The system of claim 11, wherein the system is a vehicle-to-everything (V2X) system that is co-located with an access point that serves a geographic location associated with the vehicle or a geographic location associated with the incident.

16. The system of claim 11, wherein the system is a vehicle-to-everything (V2X) system that is configured to communicate with a plurality of access points, wherein an access point in the plurality of access points serves a geographic location associated with the vehicle or a geographic location associated with the incident.

17. A method, comprising:
- receiving, based on user input to an interface of a vehicle, information indicating an incident associated with the vehicle, wherein the user input indicates whether the incident is associated with a user of the vehicle or an event outside of the vehicle;
- transmitting, to a system and via a transceiver of the vehicle, a message indicating the incident associated with the vehicle;
- receiving, from the system and via the transceiver of the vehicle, an acknowledgement of the message, wherein the acknowledgement indicates a classification of the incident; and
- causing the vehicle to perform one or more actions based on the incident associated with the vehicle and based on the classification of the incident.

18. The method of claim 17, wherein causing the vehicle to perform the one or more actions comprises:
- providing one or more instructions to autonomously drive the vehicle to a facility based on:
  - the user input indicating that the incident is associated with the user of the vehicle,
  - the classification of the incident, and
  - a capability of the vehicle.

19. The method of claim 17, wherein causing the vehicle to perform the one or more actions comprises:
- providing one or more instructions to autonomously park the vehicle based on:
  - the user input indicating that the incident is associated with the user of the vehicle,
  - the classification of the incident, and
  - a capability of the vehicle.

20. The method of claim 17, wherein causing the vehicle to perform the one or more actions comprises:
- providing one or more instructions to autonomously drive the vehicle along a route that bypasses the incident based on the classification of the incident and a capability of the vehicle.

21. The method of claim 17, wherein the classification of the incident is associated with a severity level, and wherein the severity level is based on whether the classification corresponds to an emergency classification or a non-emergency classification.

22. A method, comprising:
- receiving, at a system from a vehicle, a message indicating an incident associated with the vehicle, wherein the message is based on user input that indicates whether the incident is associated with a user of the vehicle or an event outside of the vehicle;
- generating a classification of the incident based on the incident associated with the vehicle, wherein the classification is an emergency classification or a non-emergency classification depending on the incident associated with the vehicle;
- transmitting, to the vehicle, an acknowledgement of the message, wherein the acknowledgement indicates the classification of the incident; and
- performing one or more actions based on the classification of the incident.

23. The method of claim 22, wherein performing the one or more actions comprises:
- identifying a plurality of other vehicles that are within a defined range from the vehicle or that are along a route associated with the vehicle; and
- transmitting, to the plurality of other vehicles and based on the classification of the incident as the emergency classification, one or more messages that indicate one or more vehicle actions to be performed by the plurality of other vehicles based on the incident associated with the vehicle.

24. The method of claim 22, wherein performing the one or more actions comprises:
- refraining from transmitting one or more messages associated with the incident to a plurality of other vehicles based on the classification being the non-emergency classification.

25. The method of claim 22, wherein generating the classification is based on other messages received from a plurality of other vehicles, wherein the other messages provide additional information that corroborates the message indicating the incident associated with the vehicle.

* * * * *